US005923758A

United States Patent [19]

Khamharn et al.

[11] Patent Number: 5,923,758

[45] Date of Patent: Jul. 13, 1999

[54] VARIABLE KEY PRESS RESYNCHRONIZATION FOR REMOTE KEYLESS ENTRY SYSTEMS

[75] Inventors: Oddy N Khamharn, Gurnee, Ill.; Curtis Norman Kell, Burlington, Wis.

[73] Assignee: Delco Electronics Corp., Kokomo, Ind.

[21] Appl. No.: 08/794,224

[22] Filed: Jan. 30, 1997

[51] Int. Cl.[6] ................................ H04L 9/00; H04L 9/12; H04L 9/32

[52] U.S. Cl. ................................ 380/23; 380/25; 380/48; 380/49; 340/825.31; 340/825.34; 375/354; 375/356

[58] Field of Search .................................. 380/23, 25, 49, 380/50, 54, 59, 48; 340/825.31, 825.34; 375/354, 356, 358, 359

[56] References Cited

U.S. PATENT DOCUMENTS 5,369,706 11/1994 Latka ........................................ 380/23
5,506,905 4/1996 Markowski et al. ....................... 380/25
5,646,996 7/1997 Latka .................................... 380/23 X
5,767,784 6/1998 Khamharn .......................... 340/825.31

*Primary Examiner*—Bernarr E. Gregory
*Attorney, Agent, or Firm*—Jimmy L. Funke

[57] ABSTRACT

The present invention provides, in a preferred embodiment, a method whereby resynchronization between a transmitter and receiver is activated intuitively by, and transparently to, an authorized user, including: transmitting at least a first message from the transmitter to the receiver; and, in response to the receiver receiving the first message, the receiver detecting the absence of synchronization between the transmitter and the receiver and performing a resynchronization procedure to restore synchronization between the transmitter and the receiver.

18 Claims, 8 Drawing Sheets

VARIABLE KEY PRESS RESYNCHRONIZATION FOR REMOTE KEYLESS ENTRY SYSTEMS

BACKGROUND OF THE INVENTION

1. Field of the Invention

The present invention relates to keyless entry systems generally and, more particularly, but not by way of limitation, to a novel method of recovering synchronization between a transmitter and a receiver of a keyless entry system.

2. Background Art

Current remote keyless entry systems that employ rolling code algorithms occasionally require resynchronization of receiver to transmitter. For instance, changing the transmitter battery, occurrence of a noise spike when writing to receiver's EEPROM, or when pressing the transmitter button(s) too many times while outside the range of the receiver may cause the system to lose synchronization. Once synchronization is lost, the system does not respond and appears inoperative. Resynchronization is required to restore the system operation to normal. Current systems require a manual sequence of operations for restoring synchronization, such as depressing lock and unlock buttons for a predetermined period of time and waiting for a lock cycle feedback. This manual operation can be confusing, and if the operator does not know the procedure, the operator may bring the keyless entry system in for service. This leads to customer dissatisfaction and high warranty cost for toe manufacturer, e.g., a vehicle manufacture.

One method to eliminate the manual resynchronization is by using non-volatile memory in the transmitter. In this circumstance it is assumed that the transmitter sequence number will never be below the receiver's sequence mumber, and therefore manual resynchronization would not be required. A further assumption is that data written and stored in the transmitter's EEPROM will always be valid. However, this method comes with many shortfalls. One is cost. EEPROM is relatively expensive, and packaging external EEPROM in the transmitter can be difficult, if not impossible, on some applications requiring minimum layout area. With EEPROM, complex program routines are required to guarantee that the data written is truly valid, otherwise complete reprogramming of the system will be necessary to recover normal operation. This is time consuming and is a great inconvenience to the end user. The factors of cost, packaging, EEPROM reliability, and increase in code size dictate that using EEPROM in the transmitter is not a reliable nor viable method for keeping the system in synchronization. What is needed, but heretofore has been unavailable, is a method whereby resynchronization is activated intuitively by, and transparently to, the operator. Such a method should also permit that the entire resynchronization process be implemented only in the receiver without need for the transmitter to store any special resynchronization commands, nor execute any special program routines to recover synchronization. Additionally, a method is needed whereby the authorized user is not expected to learn any complicated resynchronization procedures.

Accordingly, it is a principal object of the present invention to provide a method for restoring synchronization between a transmitter and receiver without the use of special manual resynchronization procedures.

A further object of the present invention is to reduce costs by eliminating EEPROM in the transmitter.

An additional object of the present invention is to reduce the RF design of the transmitter by eliminating external EEPROM in the transmitter.

It is yet a further object of the present invention to eliminate special EEPROM validation program routines in the transmitter and receiver.

It is yet an additional object of the present invention to maintain the security level between transmitter and receiver.

It is yet another object of the present invention to provide more packaging flexibility of the system by eliminating the need for external EEPROM in the transmitter.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a method whereby resynchronization between a transmitter and receiver is activated intuitively by, and transparently to, an authorized user, said method comprising: transmitting at least a first message from said transmitter to said receiver; and in response to said receiver receiving said first message, said receiver performing a resynchronization procedure to restore said synchronization between said transmitter and said receiver.

BRIEF DESCRIPTION OF THE DRAWINGS

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENT

Figure 1:
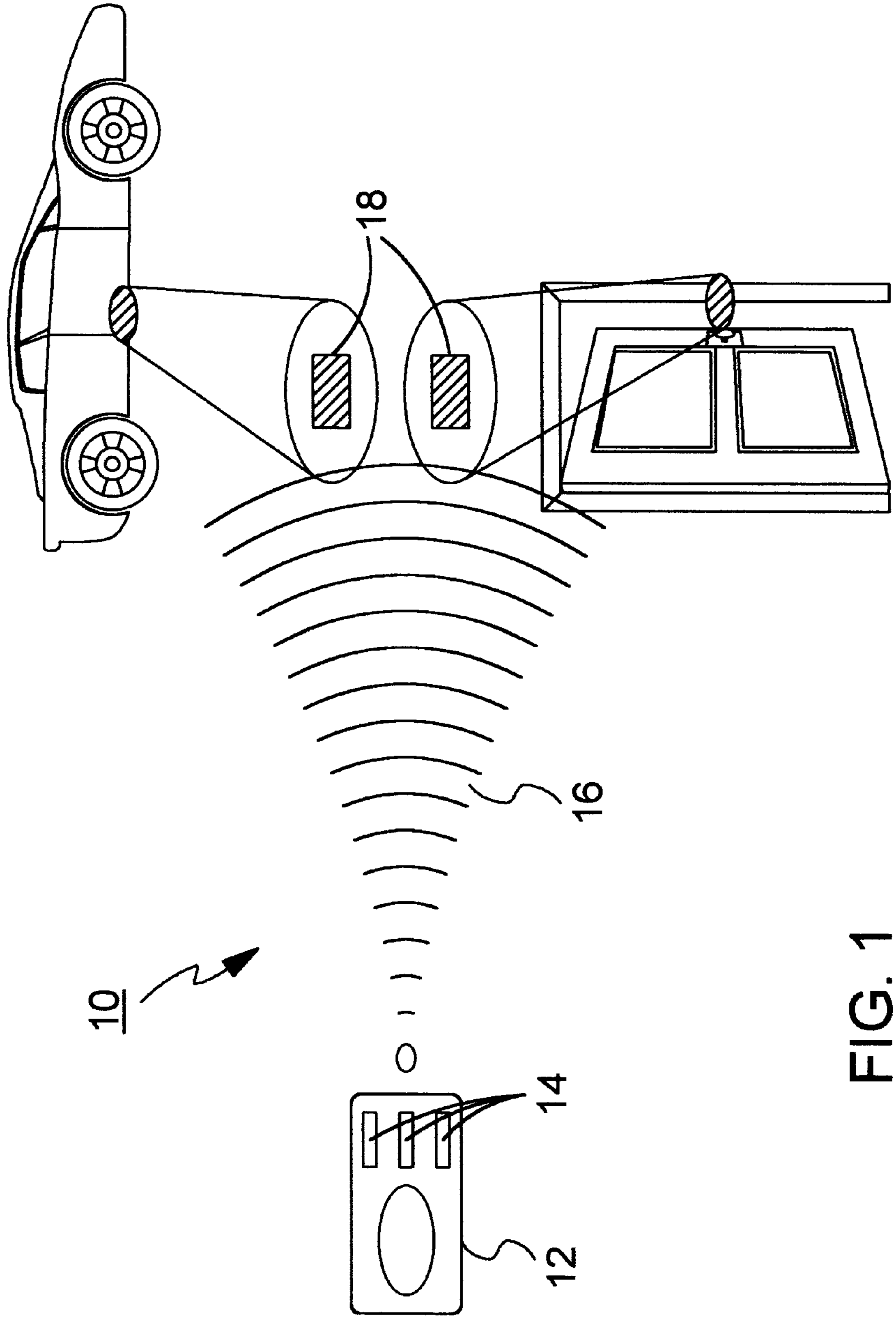
FIG. 1 is a pictorial diagram of the system of the present invention.

Reference should now be made to the drawing figures on which similar or identical elements are given consistent identifying numerals throughout the various figures thereon, and on which parenthetical references to figure numbers direct the reader to the view(s) on which the element(s) being described is (are) best seen, although the element(s) may be seen also on other views.

FIG. 1 shows the elements associated with the system of the present invention. A remote keyless entry system, generally indicated by reference numeral 10, which includes a transmitter 12 used by an authorized user to transmit a desired function (e.g., door lock, door unlock, panic) and a receiver 18 located within a vehicle or structure for which keyless entry is desired. Transmitter 12 emits RF signals 16 in response to use activation of one or more buttons 14 associated with transmitter 12. Receiver 18 periodically checks for the presence of a transmission and performs the requested function only if the fields within message structure 20 (FIG. 2) are intended for that particular receiver and contains valid security information. As is described in detail below, the present invention establishes a resynchronization process under circumstances whereby pressing button 14 causes transmitter 12 to emit signals 16 which are, in turn, received by receiver 18 and do not match stored values in the receiver such that message 20 is not authenticated and the receiver fails to execute function code 24. Under these circumstances, receiver 18 establishes one of a set of resynchronization processes, which may require pressing button 14 additional times, as can be understood to be a perfectly intuitive reaction to an apparent initial failure of function 24 to be executed.

Figure 2:
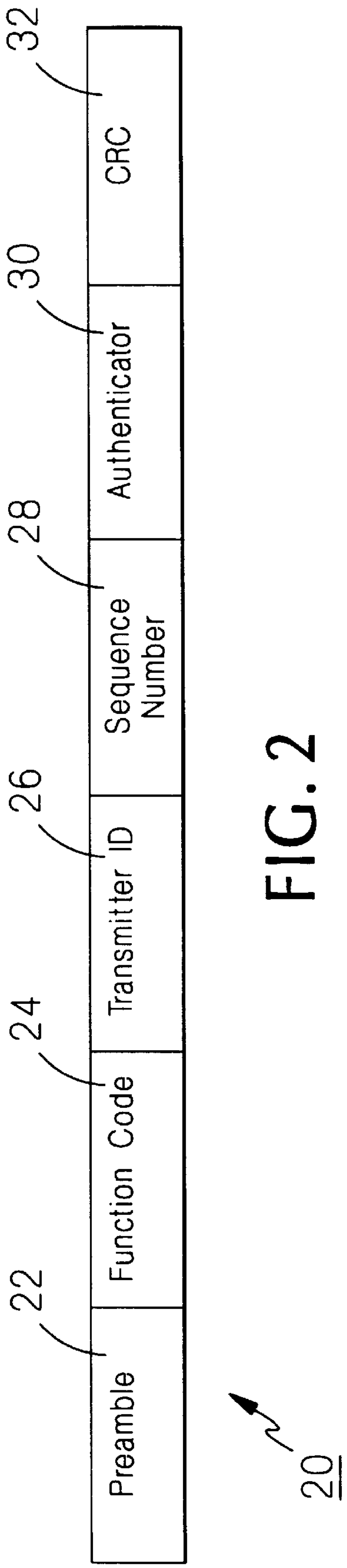
FIG. 2 is a representation of the message structure for normal messages used in conjunction with the system of the present invention.

Reference should now be made to FIG. 2. Message structure 20 is transmitted for normal functions (e.g.,door lock, door unlock, panic) upon depressing one or more buttons 14 of transmitter 12. Message structure 20 provides for dynamic security encoding to prevent the recording and subsequent playback of otherwise legitimate messages and to prevent receiver 18 from being deceived into accepting messages from unauthorized sources. Once transmitter 12 is manufactured it is programmed with a transmitter ID 26, an initial first sequence number value (SQN1) 28, a random initial state (not shown), and a cryptographic key (not shown). Transmitter ID 26 is a unique binary number associated with each individual transmitter 12, as is the random initial state, whereas the cryptographic key may, be common to all transmitters. The random initial state is used as a starting point from which an authentication code is advanced with each message 20 transmission. SQN128 also advances with each message 20 transmission to indicate the required number of advances that receiver 18 must perform to cryptographically synchronize with the transmission. Message 20 comprises preamble 22 which indicates the start of a message, function code 24 which identifies the function being requested, transmitter ID 26, SQN128 which is used to synchronize transmitter 12 and receiver 18 to account for situations in which messages are received in error due to RF noise, or transmitter 12 is operated beyond the range of receiver 18, or when the battery of transmitter 12 s replaced, authenticator 30 which is a calculation using an algorithm to combine a cryptographic key with function code 24 and CRC 32 which is a cyclic redundancy check code to permit receiver 18 to validate the integrity of message transmission. Message structure 20 provides for system security by preventing the deception of receiver 18 by interception, recording, and subsequent playback of RF signals 16 since SQN128 is advanced with each transmission; therefore, a recorded message 20 when played back will have an SQN1 28 different than expected by receiver 18 and hence will fail synchronization verification and not be accepted. Message structure 20 provides additional system security by preventing the spoofing (emulation) of messages since modification of function code 24 (e.g., modifying lock command to unlock command) will cause receiver 18 to calculate an incorrect authenticator 30. Since authenticator 30 is derived in part from a cryptographic key known only to transmitter 12 and receiver 18, unauthorized parties cannot generate an authenticator 30 that corresponds to function code 24 of their choosing and therefore message structure 20. cannot be artificially constructed in a manner that would be acted upon by receiver 18.

Figure 3:
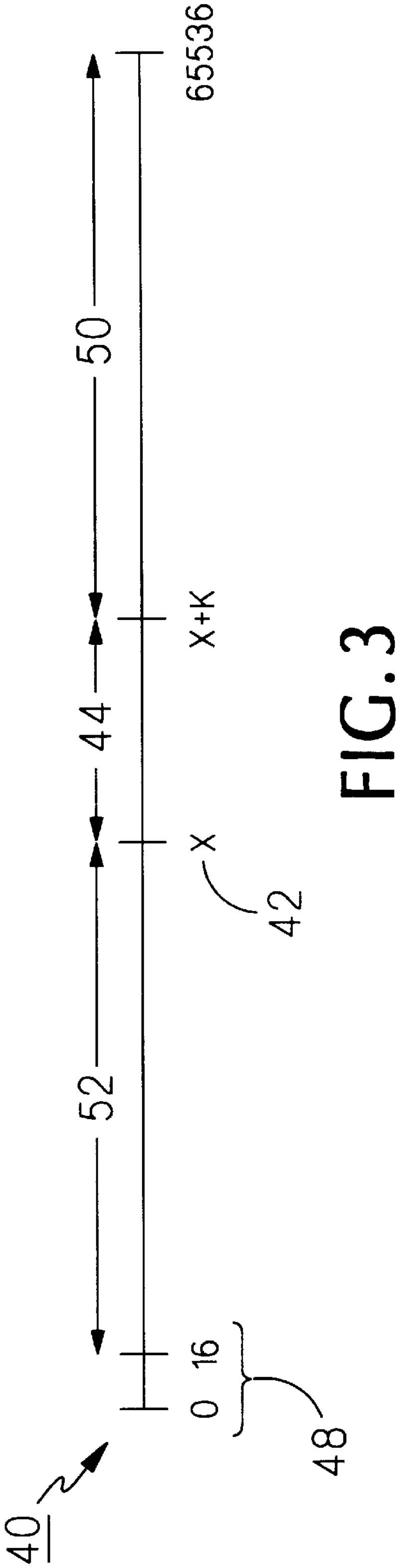
FIG. 3 is a representation of the areas within a cryptographic key space of the message structure where synchronization can be lost.

Reference should now be made to FIG. 3 which shows the areas within the cryptographic key space where synchronization can be lost. Sequence number line 40 shows four distinct resynchronization areas dependent on the values of SQN1 28 as received by receiver 18 and receiver second sequence number (SQN2) 42. If it is assumed, for purposes of illustration, that SQN1 28 comprises a 16-bit binary field then the maximum value of SQN1 28 is $2^{16}$ or 65536. Receiver sequence number SQN2 42, which is stored in receiver 18 and is equal to the most recently received and validated SQN1 28, therefore could lie anywhere along sequence number line 40, having a value between 0 and 65536, inclusive. It is when received SQN1 28 does not match an expected value based on SQN2 42 that synchronization between transmitter 12 and receiver 18 is considered lost and resynchronization must occur.

A first resynchronization process occurs within synchronization window 44, a resynchronization area whereby, subsequent to a first message 20 reception, SQN1 28 received is greater than SQN2 42 by not more than K increments (i.e., SQN1 28<=SQN2 42+K). In this case, receiver 18 will automatically advance SQN2 42 to equal SQN1 28 and then authenticate message 20.

A second resynchronization process occurs within auto-resync window 48, a resynchronization area whereby, subsequent to a first message 20 reception, SQN1 28 received is less than or equal to a value of 16 and is also less than SQN2 42 (i.e., SQN2 42>SQN1 28<=16), a condition generally occurring when transmitter battery changes are made and Random Access Memory is lost. In this case, receiver 18 will automatically advance SQN2 42 to equal SQN1 28 and then authenticate message 20.

A third resynchronization process occurs in resynchronization area 50 whereby, subsequent to a first message 20 reception, SQN1 28 received is greater than SQN2 42 by more than K increments (i.e., SQN1 28>SQN2+K). In this case, receiver 18 will execute a resynchronization process dependent upon receiving and verifying a second message 20 reception.

A fourth resynchronization process occurs in resynchronization area 52 whereby, subsequent to a first message 20 reception, SQN1 28 received is greater than auto-resync window 48 yet less than SQN2 42. In this case, receiver 18 will execute a resynchronization process dependent upon receiving and verifying a second and a third message 20 reception.

Figure 4:
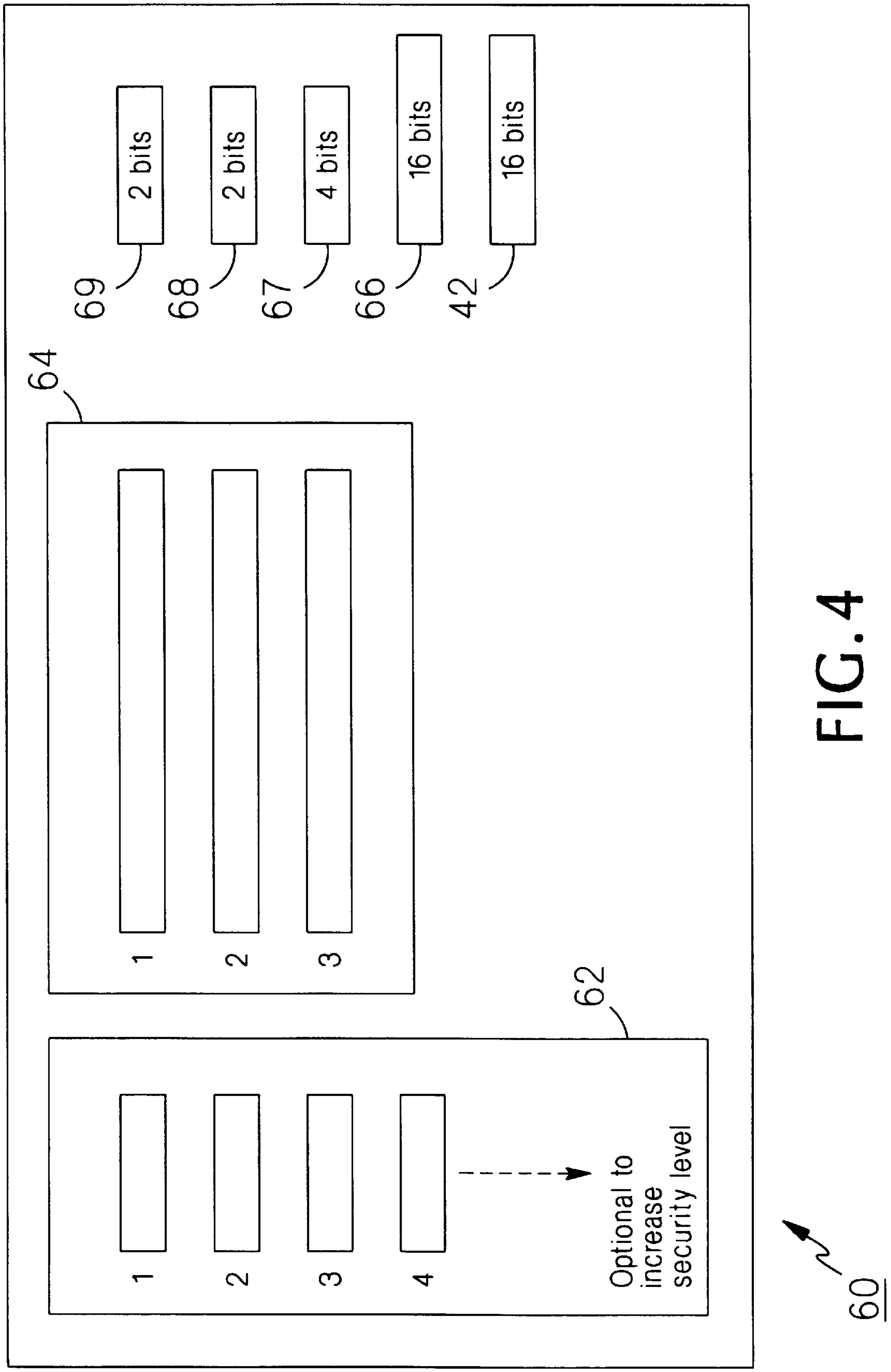
FIG. 4 is a block diagram of the variable key press memory map of the system of the present invention.

Reference should now be made to FIG. 4 which shows a memory map of the system of the present invention, generally indicated by reference numeral 60. SQN history 62 FIFO memory is used by receiver 18 to dwarf attempts of recording three sequential messages in a row for purposes of playback attacks by maintaining a log of prior authenticated SQN1 28 values. Every time receiver 18 receives three or more sequential message 20 transmissions containing the same transmitter ID 26 and function code 24, it stores the most recently received SQN1 28 into SQN history 62 in a First-In-First-Out (FIFO) sequence. By increasing the number of SQN history 62 memory locations, the security of the system of the present invention is enhanced since the likelihood of matching the SQN1 28 of a received message 20 transmission to one previously transmitted is increased. Resynchronization processes 3 and four utilize message 20 transmissions with sequential SQN1 28 values and identical function code 24 values which decreases the likelihood of unauthorized sources recording a possible resynchronization sequence of transmissions. In addition, use of this process decreases the amount of write cycles to non-volatile memory of receiver 18, thereby extending its life.

Verification (VERF) 64 memory location provides for temporary storage of invalid SQN1 28 values and corresponding authenticator 30 values when SQN1 28 values are in resynchronization areas 50 or 52. Receiver 18 stores successive SQN1 28 values and corresponding successive authenticator 30 values from a successive message 20 transmissions in a successive VERF 64 locations, whereby a successive second message 20 transmission must occur for resynchronization area 50 and a second and a third successive message 20 transmission must occur for resynchronization area 52. If the successive message 20 transmissions contain the same transmitter ID 26 and function code 24, and SQN1 28 is sequential to the values stored in VERF 64 and there is not a match between most recent SQN1 28 and SQN1 28 values stored in SQN history 62, then the successive transmissions of message 20 are authenticated. It is preferred that the authentication process be performed after all requisite sequential transmissions of message 20 have been received in order to reduce latency time and reduce unnecessary computation. Upon successful authentication, function 24 As executed and SQN1 28 from the most recent transmission is stored in SQN history 62.

Memory location NSQN 66 is where most recently received SQN1 28 value is stored while message 20 authentication process occurs. The value stored in NSQN 66 is compared to SQN2 42 to determine what level of resynchronization may be required. Subsequent to a successful message 20 authentication, memory location SQN2 42 is updated to contain the value of SQN1 28 stored in NSQN 66. Button number 67 memory location is used to store function code 24 associated with a specific button 14 press of transmitter 12. Count 68 memory location stores a value of how many successive message 20 transmissions are required to achieve resynchronization. Press 69 memory location stores a value of how many successive message 20 transmissions have been received.

Figure 5A:
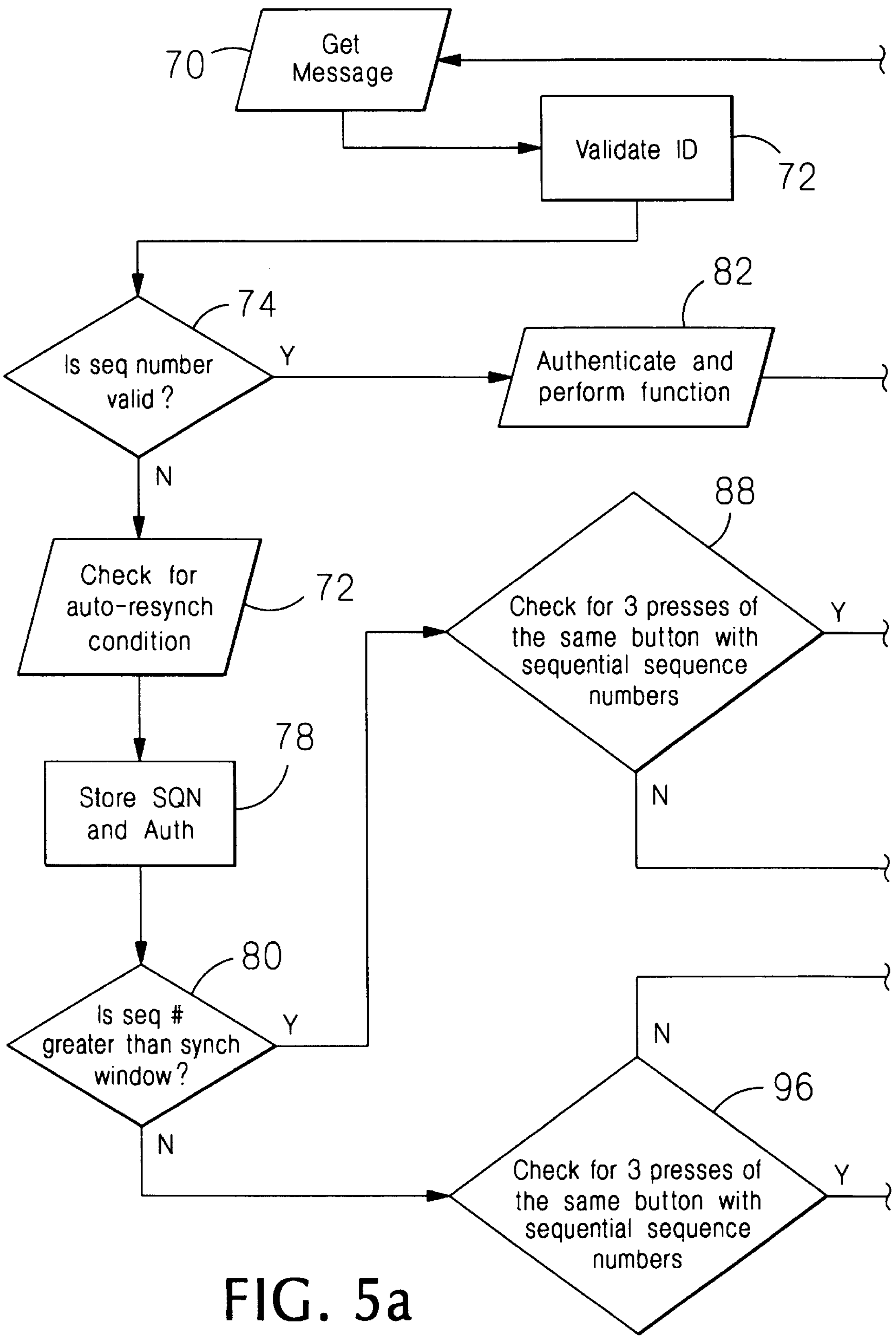
FIGS. 5*a* and 5*b* comprise a flow diagram of the resynchronization process.
Figure 5B:
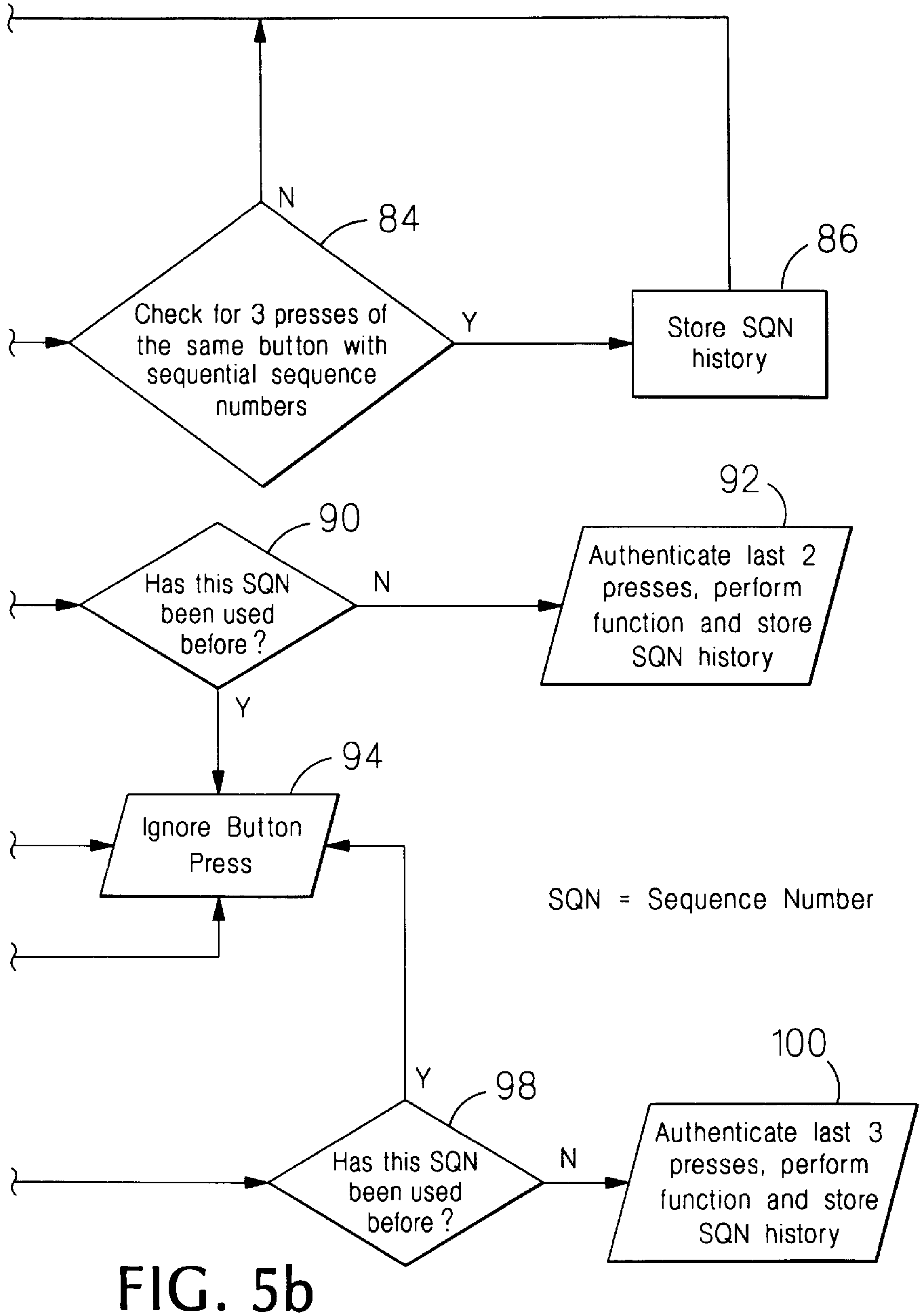

Reference now to FIG. 5 which shows a variable key press resynchronization flow chart comprising the following processes:

(a) Upon receipt of message 20 at step 70 as a result of one or more button 14 presses at transmitter 12, receiver 18 validates transmitter ID 26 at step 72 and then checks if NSQN 66 is valid, i.e., within sync window 44, at step 74.

(b) If SQN1 28 value stored in NSQN 66 is vaild receiver 18 authenticates message 20, performs the function 24 at step 82, and checks count 68 memory location to determine if three successive message 20 transmissions have been authenticated in which case value of NSQN 66 is stored into SQN History 62 at step 86.

(c) If at step 74, SQN1 28 value stored in NSQN 66 is not validated to be within sync window 44, the value of NSQN 66 is checked to be within auto resynch window 48 at step 76 and if so, the value of NSQN 66 and authenticator 30 are stored in VERF 64 memory location at step 78.

(d) At step 80, if the value of NSQN 66 is greater than synch window 44, and at step 88, if two successive message 20 transmissions have been received whereby press 69 memory location indicates 2 presses have been made of the same button 14 from button 67 memory location and whereby the value of NSQN 66 is sequential to value stored in VERF 64, and at step 90 the value of NSQN 66 does not compare with a value in SQN History 62, then at step 92 receiver 18 authenticates said two successive message 20 transmissions, performs function 24, and stores the value of NSQN 66 into SQN history 62 and into SQN2 42.

(e) If two successive message 20 transmissions have not been received at step 88 or if a match is determined between the value of NSQN 66 and a value in SQN History 62, then button 14 press is ignored at step 94 and receiver 18 awaits a new message 20 at step 70.

(f) If a step 80, the value of NSQN 66 is not greater than sync window 44, then at step 96, if three successive message 20 transmissions have been received whereby press 69 memory location indicates 3 presses have been made of the same button 14 from button 67 memory location and whereby the value of NSQN 66 is sequential to value stored in VERF 64, and at step 99 the value of NSQN 66 does not compare with a value in SQN History 62, then at step 100 receiver 18 authenticates said three successive message 20 transmissions, performs function 24, and stores the value of NSQN 66 into SQN history 62 and into SQN2 42.

(g) If three successive message 20 transmissions have not been received at step 96 or if a match is determined between the value of NSQN 66 and a value in SQN History 62 at step 98, then button 14 press is ignored at step 94 and receiver 18 awaits a new message 20 at step 70.

Figure 6A:
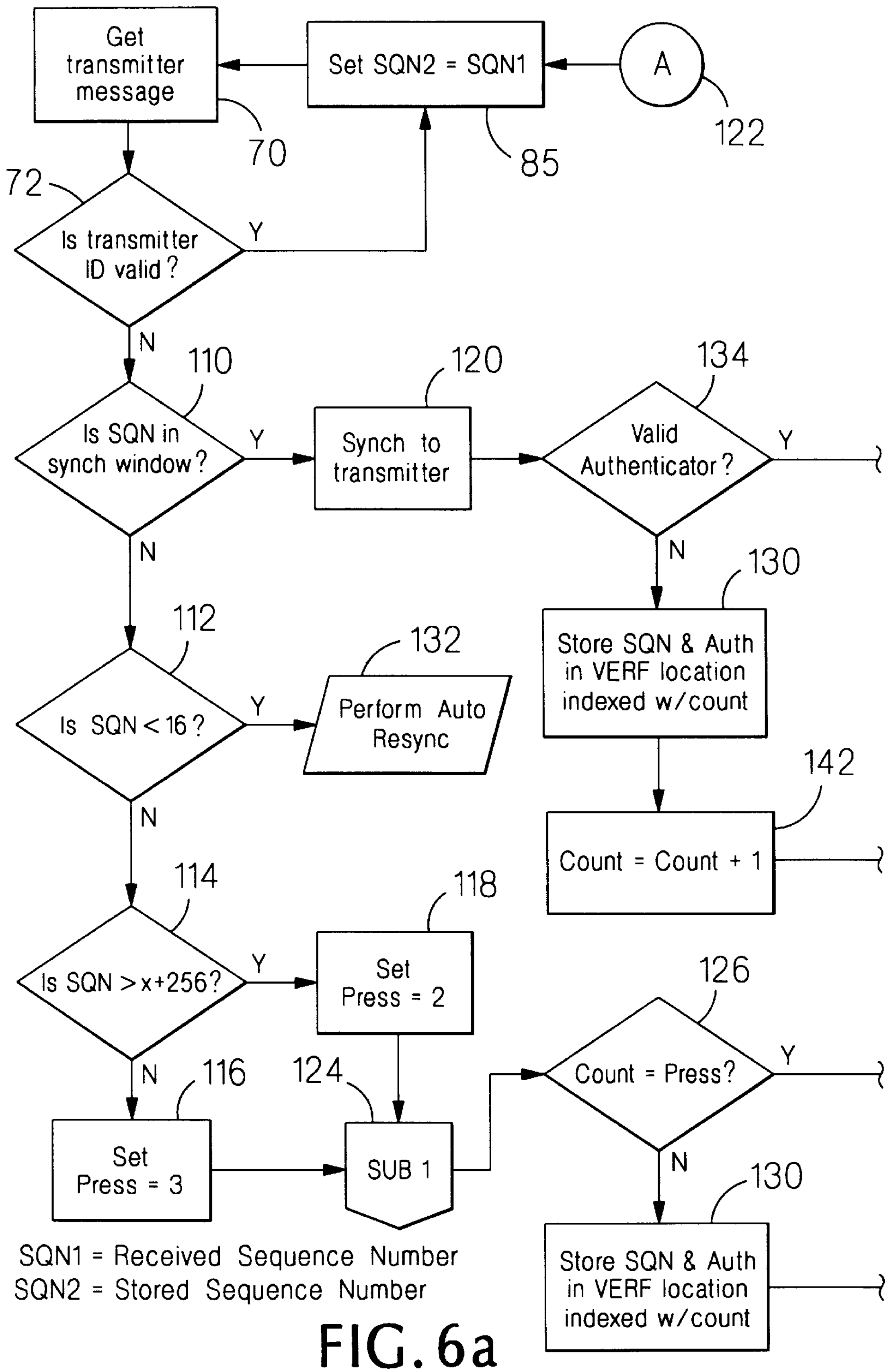
FIGS. 6*a*, 6*b* and comprise a flow diagram of t he resynchronization process algorithm.
Figure 6B:
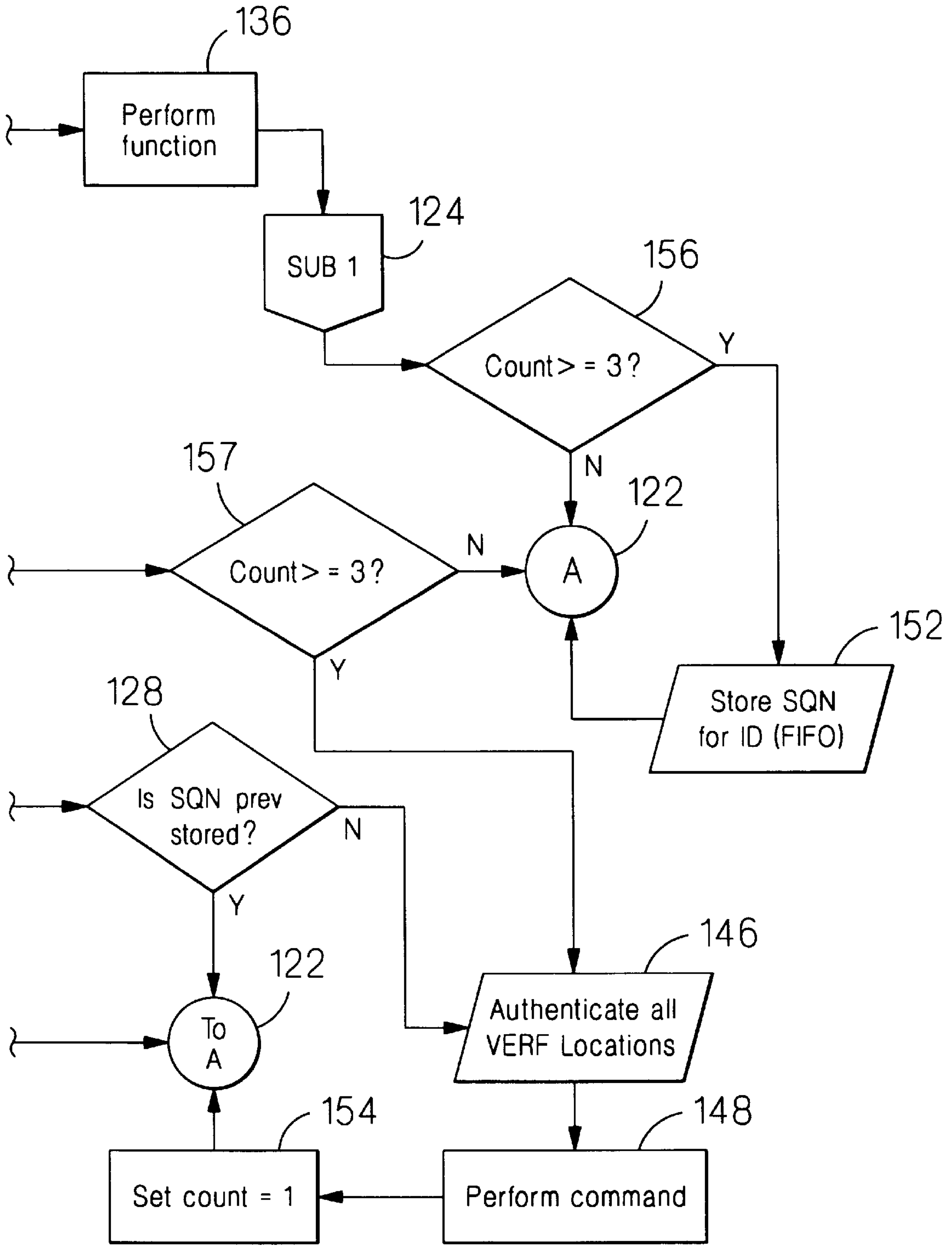

Reference should now be made to FIG. 6 which shows a detailed variable key press resynchronization algorithm flow chart which comprises the following processes:

(h) Upon receipt of Message 20 at step 70 as a result of a button 14 press of transmitter 12, receiver 18 checks for valid transmitter ID 26 at step 72. If transmitter ID 26 is not valid, SQN2 42 is set equal to SQN1 28 as was stored in NSQN 66 at step 85 and receiver 18 awaits receipt of the next message 20 at step 70.

(i) If step 72 is a valid transmitter ID 26, the value of SQN1 28 as stored in NSQN 66 is checked to be within sync window 44 at step 110, and if yes, receiver 18 stores the value of NSQN 66 into SQN2 42 at step 120, validates authenticator 30 at step 134, performs function 24 at step 136, executes subroutine 124 to update button 67 and count memory location values, checks if count 68 value is now greater or equal to three at step 157 and if yes stores the value of NSQN 66 into SQN history 62 at step 152, otherwise if count 68 value is not greater than or equal to three at step 157, stores the value of NSQN 66 into SQN2 42 at step 95 and awaits next message 20 at step 70.

(j) If at step 134, authenticator 30 is not validated, the value of NSQN 66 and authenticator 30 are stored in VERF 64 indexed with count 68 value, count 68 value is incremented by 1 at step 142, count 68 value is checked if greater or equal to 3 and if yes authenticates all values stored in VERF 64 at step 146, performs function 24 at step 148, sets count 68 value to 1 at step 154, stores the value of NSQN 66 into SQN2 42, and awaits next message 20 at step 70.

(k) If at step 156 count 68 value is not greater than or equal to three, stores the value of NSQN 66 into SQN2 42 at step 85 and awaits next message 20 at step 70.

(l) If at step 110, the value of NSQN 66 is not within synch window 44, then the value of NSQN 66 is checked at step 112 to be within auto resynch window 48, and if yes, receiver 18 performs auto-resynch sub-routine at step 132 (details not shown but which include store the value of NSQN 66 into SQN2 42, validate authenticator 30, perform function 24, and await new message 20 transmission).

(m) If, at step 112, the value of NSQN 66 is not in auto-resynch window 48, then at step 114 the value of NSQN 6 is checked if greater than SQN2 42 by K increments, and if yes, press 69 value is set equal to 2 at step 118, then subroutine 124 is executed to update button 67 and count 68 memory location values, then count 68 value is checked if equal to press 69 value at step 126 indicating that the requisite number of successive message 20 have been received and if yes checks that no duplicate values of NSQN 66 are stored in SQN history 62 at step 128, authenticates all values stored in VERF 64 at step 146, performs function 24 as step 148, sets count 68 value to 1 at step 154, stores the value of NSQN 66 into SQN2 42, and awaits next message 20 at step 70.

(n) If count 68 value is not equal press 69 value at step 126, the value of NSQN 66 and authenticator 30 are stored in VERF 64 indexed with count 68 value, the value of SQN1 as stored in NSQN 66 is stored into SQN2 42 at step 85 and receiver 18 awaits next message 20 transmission at step 70.

(o) If the value of NSQN 66 is greater than SQN2 42+K at step 114, then press 69 value is set to three, subroutine 124 is executed to update button 67 and count 68 memory location values, then count 68 value is checked if equal to press 69 value at step 126 indicating whether or not the requisite number of successive message 20 have been received, the flow is the same as previously identified for step 126 onward.

Figure 7:
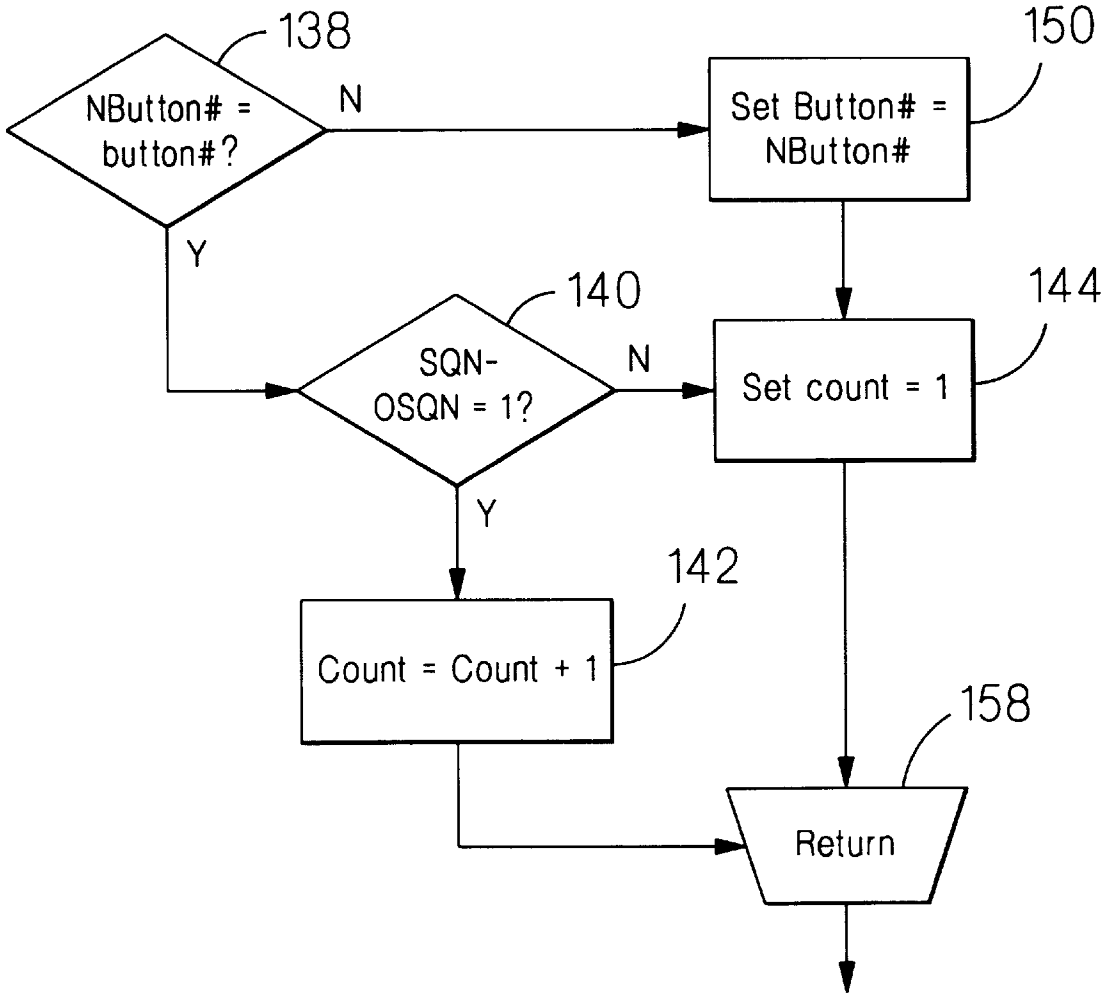

Reference should now be made to FIG. 7, variable key press resynchronization subroutine 124 which comprises the following processes. This subroutine determines if successively received function 24 codes (shown in flow chart as N button #) are identical and correspondingly if successively received NSQN 66 values are sequential (i.e., the value of NSQN 66=SQN2 42+1) both of which are necessary during resynchronization to permit message 20 authentication.

(p) If successive function 24 codes are equal at step 138, and the value of NSQN 66 is equal SQN2+1 at step 140, then count 68 is incremented by 1 and subroutine returns to resynchronization program where it initially exited.

(q) If successive function codes are not equal at step 138, button #67 value is set equal to the most recent received function 24 at step 150, count 68 is set at 1 at step 144, and subroutine 124 returns to the program where it initially exited.

(r) If successive NSQN 66 values are not sequential at step 140 count 68 is set to 1 and subroutine 124 returns to where it initially exited.

It will thus be seen that the objects set forth above, among those elucidated in, or made apparent from, the preceding description, are efficiently attained and, since certain changes may be made in the above method without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. A method for restoring synchronization between a transmitter and a receiver comprising:

(a) transmitting at least a first message from said transmitter to said receiver, said message including a first function code, said first function code comprising a binary value derived from a button depression of said transmitter; and (b) in response to said receiver receiving said at least said first message, said receiver detecting the absence of synchronization between said transmitter and said receiver and performing a resynchronization procedure to restore synchronization between said transmitter and said receiver.

2. A method, as defined in claim 1, whereby: said first message also comprises message elements including a preamble, a transmitter ID, a first sequence number, an authenticator code, and a CRC code.

3. A method, as defined in claim 2, whereby: said transmitter ID is a unique binary value common for said transmitter and said receiver.

4. A method, as defined in claim 2, whereby: said first sequence number is a 16 bit binary which is incremented for each said first message by a program algorithm.

5. A method, as defined in claim 2, whereby: said authenticator code is a binary value algorithmically derived based on a cryptographic key contained within said transmitter and said receiver.

6. A method, as defined in claim 2, whereby: said CRC is a binary value algorithmically calculated from said binary values of other said elements of said first message.

7. A method, as defined in claim 1, whereby: said receiving said first message includes parsing said first message into message elements.

8. A method, as defined in claim 7, whereby: selected said message elements are stored in said receiver as synchronizing parameters which include a second sequence number, a second function code, a message count value, a message number value, a sequence number history memory, and first, second, and third message verification values.

9. A method, as defined in claim 1, whereby: said resynchronization procedure includes validating said transmitter ID, determining one of first, second, third, or fourth resynchronization levels, and establishing one of first, second, third, or fourth resynchronization processes.

10. A method, as defined in claim 9, whereby: said transmitter ID is compared with said second transmitter ID such that a comparison match permits continued processing of said first message.

11. A method, as defined in claim 9, whereby: establishing said first resynchronization process results from comparing said first sequence number with said second sequence number stored in said receiver and determining that a relationship exists according to the following equation:

$$SQN2<SQN1<=SQN2+K$$

where:

SQN1 is said first sequence number,

SQN2 is said second sequence number, and

K is a binary constant.

12. A method, as defined in claim 11, whereby: said first resynchronization process comprises:

(a) storing said first sequence number into memory location of said second sequence number, checking for valid said authenticator whereby if valid go to step (b), otherwise if not valid, store said first sequence number and said authenticator value in said verification memory indexed by said count value, increment said count value by 1, check if said count value is greater or equal to 3 and if so authenticate all said verification memory values, performing said function, setting sand count value equal 1, setting said second sequence number value equal to said first sequence number value and await a subsequent message;

(c) comparing said first function code with said stored second function code, whereby if not equal store said first function code value into said second function code memory location, then set said stored count value equal 1; otherwise if comparison is equal, check for said first sequence number greater by 1 than said stored second sequence number whereby increment said count value by 1, otherwise set said count value equal 1; and (d) checking if said count value is greater or equal to three, whereby store said first sequence number into said sequence number history FIFO memory, then set said second sequence number memory location equal to said first sequence number value and await a subsequent message, otherwise set said second sequence number memory location equal to said first sequence number value and await a subsequent message.

13. A method, as defined in claim 9, whereby establishing said second resynchronization process results from comparing said first sequence number with said second sequence number stored in said receiver and determining that a relationship exists according to the following equation:

$$16>=SQN1, SQN2$$

where:

SQN1 is said first sequence number, and

SQN2 is said second sequence number.

14. A method, as defined in claim 13, whereby: said second resynchronization process comprises said first sequence number into memory location of said second sequence number, authenticating said first message, storing said first sequence number into said sequence number history memory, and awaiting a subsequent message.

15. A method, as defined in claim 9, whereby: establishing said third resynchronization process results from comparing said first sequence number with said second sequence number stored in said receiver and determining that a relationship exists according to the following equation:

$$SQN1>SQN2+K$$

where:

SQN1 is said first sequence number,

SQN2 is said second sequence number, and

K is a binary value constant.

16. A method, as described in claim 15, whereby: said third resynchronization process comprises:

(a) setting number of message cycles value equal 2 to be received for said resynchronization process to be complete;

(b) comparing said first function code with said stored second function code, whereby if not equal store said first function code value into said second function code memory location, then set said stored count value equal 1; otherwise if comparison is equal, check for said first sequence number greater by 1 than said stored second sequence number whereby increment said count value by 1, otherwise set said count value equal 1;

(c) comparing said stored count value with said message cycle value whereby if not equal store said first sequence number and said authenticator value in said verification memory indexed by said count value, otherwise if equal, compare said first sequence number with values stored in said sequence number history FIFO for match with previously stored said first sequence number values and if no match then authenticate all said verification memory values, perform said function, set said count value equal 1, set said second sequence number memory location equal to said first sequence number value, and await a subsequent message, whereas if match between said first sequence number value with values stored in said sequence number history FIFO, then set said second sequence number memory location equal co said first sequence number value and await next said message; and (d) repeating steps (a) through (c) until said receiver is resychronized with said transmitter.

17. A method, as defined in claim 9, whereby: establishing said fourth resynchronization process results from comparing said first sequence number with said second sequence number stored in said receiver and determining that a relationship exists according to the following equation:

$$16<SQN1<SQN2$$

where:

SQN1 is said first sequence number, and

SQN2 is said second sequence number.

18. A method, as defined in claim 17, whereby: said fourth resynchronization process comprises:

(a) setting number of message cycles value equal 3 to be received for said resynchronization process to be complete;

(b) comparing said first function code with said stored second function code, whereby if not equal store said first function code value into said second function code memory location, then set said stored count value equal 1; otherwise if comparison is equal, check for said first sequence number greater by 1 than said stored second sequence number whereby increment said count value by 1, otherwise set said count value equal 1;

(c) comparing said stored count value with said message cycle value whereby if not equal store said first sequence number and said authenticator value in said verification memory indexed by said count value, otherwise if equal, compare said first sequence number with values stored in said sequence number history FIFO for match with previously stored said first sequence number values and if no match then authenticate all said verification memory values, perform said function, set said count value equal 1, set said second sequence number memory location equal to said first sequence number value, and await next said message, whereas it match between said first sequence number value with value stored in said sequence number history FIFO, then set said second sequence number memory location equal to said first sequence number value and await a subsequent message; and (d) repeating steps (a) through (c) until said receiver is resynchronized with said transmitter.

* * * * *